US010793707B2

(12) United States Patent
Sun et al.

(10) Patent No.: US 10,793,707 B2
(45) Date of Patent: Oct. 6, 2020

(54) COMPOSITION WITH BALANCE OF DISSIPATION FACTOR AND ADDITIVE ACCEPTANCE

(71) Applicant: Dow Global Technologies LLC, Midland, MI (US)

(72) Inventors: Yabin Sun, Shanghai (CN); Jeffrey M. Cogen, Collegeville, PA (US); Manish Mundra, Collegeville, PA (US); Timothy J. Person, Collegeville, PA (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 16/461,259

(22) PCT Filed: Nov. 16, 2017

(86) PCT No.: PCT/CN2017/111249
§ 371 (c)(1),
(2) Date: May 15, 2019

(87) PCT Pub. No.: WO2018/090940
PCT Pub. Date: May 24, 2018

(65) Prior Publication Data
US 2019/0270870 A1 Sep. 5, 2019

Related U.S. Application Data

(60) Provisional application No. 62/422,953, filed on Nov. 16, 2016.

(51) Int. Cl.
H01B 9/02 (2006.01)
C08L 23/08 (2006.01)
(Continued)

(52) U.S. Cl.
CPC ........ C08L 23/0853 (2013.01); C08F 210/02 (2013.01); C08K 5/14 (2013.01);
(Continued)

(58) Field of Classification Search
CPC .. H01B 3/441; H01B 7/02; H01B 9/02; C08L 23/0853; C08F 210/02
(Continued)

(56) References Cited

U.S. PATENT DOCUMENTS 3,499,791 A 3/1970 Maloney
3,795,646 A 3/1974 Mac Kenzie et al.
(Continued)

FOREIGN PATENT DOCUMENTS

CN 102682905 A 9/2012
CN 103665529 A 3/2014
(Continued)

Primary Examiner — William H. Mayo, III
(74) Attorney, Agent, or Firm — Quarles & Brady LLP

(57) ABSTRACT

A composition having a) an ethylene-based copolymer made of units derived from ethylene and units derived from at least one comonomer of Structure I, wherein R is a C1-C2 hydrocarbyl group and R' is a C1-C4 hydrocarbyl group; b) at least one antioxidant; c) from greater than 0 wt % to less than 3 wt % of an organic peroxide, based on the total weight of the composition; d) optionally, at least one co-agent; and e) optionally, at least one tree retardant, wherein the ethylene-based copolymer has a melt temperature (Tm) (° C.) and a comonomer content in moles per 100 grams ethylene-based copolymer (mol/100 g) (comonomer) that satisfies the relationship Tm<−73.022 (comonomer)+109.3.

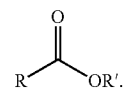

(Structure I)

17 Claims, 2 Drawing Sheets

(51) Int. Cl.
    *C08K 5/14*      (2006.01)
    *C08K 5/3435*      (2006.01)
    *C08K 5/3492*      (2006.01)
    *C08K 5/36*      (2006.01)
    *C08F 210/02*      (2006.01)
    *C08K 5/375*      (2006.01)
    *H01B 3/44*      (2006.01)
    *H01B 7/02*      (2006.01)

(52) U.S. Cl.
    CPC ........ *C08K 5/3435* (2013.01); *C08K 5/34924* (2013.01); *C08K 5/36* (2013.01); *C08K 5/375* (2013.01); *H01B 3/441* (2013.01); *H01B 7/02* (2013.01); *H01B 9/02* (2013.01); *C08F 2800/20* (2013.01); *C08F 2810/20* (2013.01); *C08L 2203/202* (2013.01)

(58) Field of Classification Search
    USPC .............. 174/110 R–110 PM, 120 R–121 SR
    See application file for complete search history.

(56) References Cited

U.S. PATENT DOCUMENTS

| | | |
|---|---|---|
| 3,956,420 A | 5/1976 | Kato et al. |
| 4,101,445 A | 7/1978 | Levine et al. |
| 4,144,202 A | 3/1979 | Ashcroft et al. |
| 4,206,260 A | 3/1980 | McMahon |
| 4,299,713 A | 11/1981 | Maringer et al. |
| 4,302,565 A | 11/1981 | Goeke et al. |
| 4,400,429 A | 8/1983 | Barlow et al. |
| 4,508,842 A | 4/1985 | Beran et al. |
| 4,973,299 A | 11/1990 | Rubin et al. |
| 5,272,236 A | 12/1993 | Lai et al. |
| 5,272,872 A | 12/1993 | Grutter et al. |
| 5,317,036 A | 5/1994 | Brady, III et al. |
| 5,332,793 A | 7/1994 | Cann |
| 5,342,907 A | 8/1994 | Cann et al. |
| 5,371,145 A | 12/1994 | Daniell et al. |
| 5,405,901 A | 4/1995 | Daniell et al. |
| 5,410,003 A | 4/1995 | Bai |
| 5,874,513 A * | 2/1999 | Watanabe ............... B32B 27/32 526/348.1 |
| 6,586,509 B1 * | 7/2003 | Bostrom ............... C08K 5/0025 524/289 |
| 8,680,399 B2 | 3/2014 | Eaton |
| 2011/0147041 A1 * | 6/2011 | Sengupta ............... C08L 23/06 174/110 SR |
| 2013/0032376 A1 * | 2/2013 | Fagrell ............... C08L 23/0846 174/120 SC |
| 2014/0295186 A1 * | 10/2014 | Fossum .................. H01B 13/06 428/391 |
| 2015/0279513 A1 * | 10/2015 | Koelblin ............... H01B 3/447 174/120 SC |
| 2016/0233005 A1 * | 8/2016 | Dalbe .................... H01B 3/441 |
| 2016/0322129 A1 * | 11/2016 | Sunnegardh ........... H01B 3/441 |
| 2017/0194075 A1 * | 7/2017 | Roos ....................... C08L 23/16 |
| 2018/0305533 A1 * | 10/2018 | Chaudhary ............. C08L 23/16 |
| 2018/0312662 A1 * | 11/2018 | Chaudhary ............ H01B 3/441 |
| 2019/0027269 A1 * | 1/2019 | Chaudhary ...... C09D 123/0815 |

FOREIGN PATENT DOCUMENTS

| | | | | |
|---|---|---|---|---|
| DE | WO00/08655 | * | 2/2000 | .............. H01B 9/02 |
| WO | 00/08655 A1 | | 2/2000 | |
| WO | 02/085954 A2 | | 10/2002 | |
| WO | 2012/177299 A1 | | 12/2012 | |
| WO | 2015/038467 A1 | | 3/2015 | |

* cited by examiner

COMPOSITION WITH BALANCE OF DISSIPATION FACTOR AND ADDITIVE ACCEPTANCE

BACKGROUND

Crosslinked polyethylene (XLPE) insulation for medium voltage (MV), high voltage (HV) and extra-high voltage (EHV) cables (e.g., power cables) must meet a complex and demanding set of technical requirements. In order to meet such requirements, it is necessary to formulate the polyethylene (PE) base resin with a number of additives. Most additives are more polar than the PE and therefore have limited solubility in the PE, that is, the PE has low additive acceptance. As a result, additives may sweat out or exude from the insulation compound during storage. This sweat out or exudation results in a variety of manufacturing and material handling challenges, such as pellet stickiness, difficulty in pellet conveying, extruder screw slippage, crystalline contaminants, build up over time and random sluffing off of additive on process equipment, etc.

Use of PE containing polar comonomers may help to increase the solubility of such additives, but the presence of even low levels of polar comonomers increases the dissipation factor of the material. Increased dissipation factor is undesirable, since dissipation factor represents electrical losses. Cable manufacturers and utilities desire to have insulation materials with the lowest possible dissipation factor (e.g., low electrical losses).

A PE composition for use in MV, HV and EHV cables having an improved balance of additive acceptance, that is, improved ability to accept additives, and particularly polar additives, and retain the additives without sweat out or exudation, and low dissipation factor is needed.

SUMMARY

The disclosure provides a composition comprising a) an ethylene-based copolymer comprising units derived from ethylene and units derived from at least one comonomer of Structure I,

(Structure I)

wherein R is a $C_1$-$C_2$ hydrocarbyl group and R' is a $C_1$-$C_4$ hydrocarbyl group; b) at least one antioxidant, c) from greater than 0 wt % to less than 3 wt % of an organic peroxide, based on the total weight of the composition; d) optionally, at least one co-agent; and e) optionally, at least one tree retardant, wherein the ethylene-based copolymer has a melt temperature (Tm) (° C.) and a comonomer content in moles per 100 grams ethylene-based copolymer (mol/100 g) (comonomer) that satisfies the relationship Tm<−73.022 (comonomer)+109.3.

The disclosure further provides a cable comprising a conductor and an insulation layer covering at least a portion of the conductor, the insulation layer comprising a) an ethylene-based copolymer comprising units derived from ethylene and units derived from at least one comonomer of Structure I,

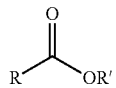

(Structure I)

wherein R is a $C_1$-$C_2$ hydrocarbyl group and R' is a $C_1$-$C_4$ hydrocarbyl group; b) at least one antioxidant; c) from greater than 0 wt % to less than 3 wt % of an organic peroxide, based on the total weight of the composition; d) optionally, at least one co-agent; and e) optionally, at least one tree retardant, wherein the ethylene-based copolymer has a melt temperature (Tm) (° C.) and a comonomer content in moles per 100 grams ethylene-based copolymer (mol/100 g) (comonomer) that satisfies the relationship Tm<−73.022 (comonomer)+109.3.

DEFINITIONS

Figure 1:
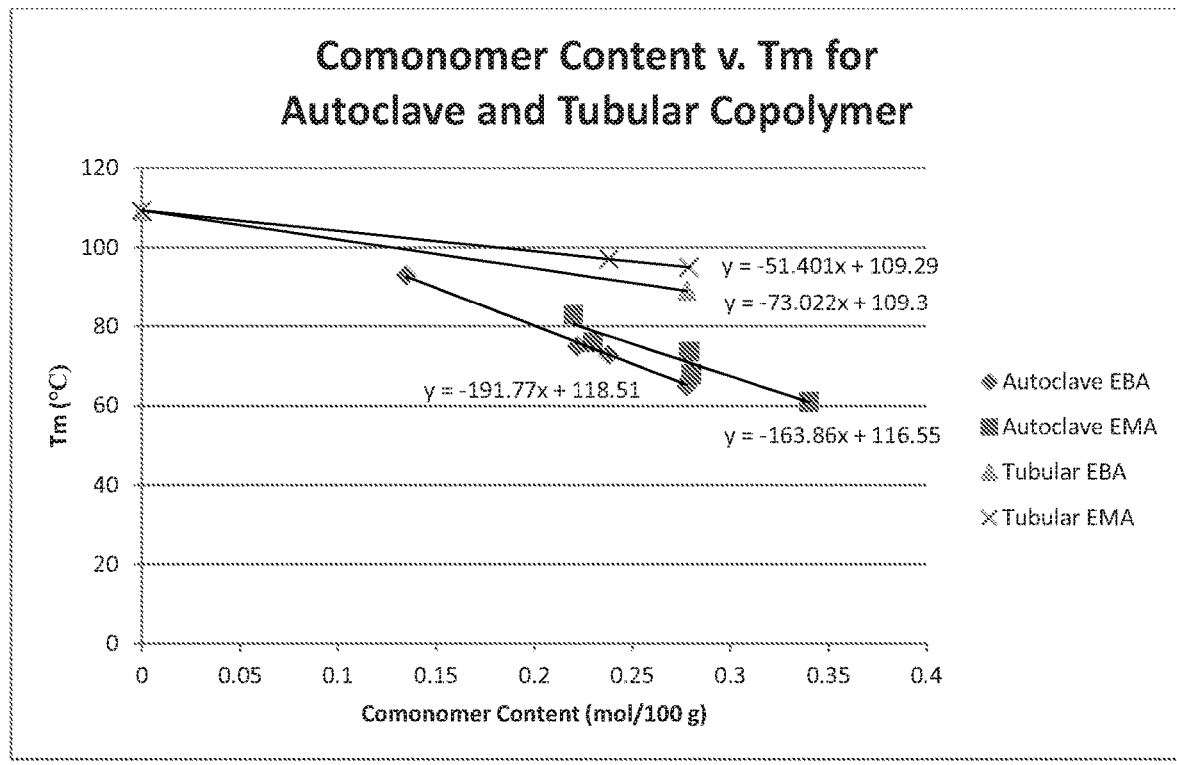
FIG. 1 is a graph showing the correlation between melt temperature and comonomer content for the different comonomer types and polymerization processes.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percents are based on weight and all test methods are current as of the filing date of this disclosure.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

An "alkyl group" is a saturated linear, cyclic or branched hydrocarbyl group.

An "alkenyl group" is a linear, cyclic, or branched hydrocarbyl group having at least one C═C double bond unsaturation.

The term "composition," as used herein, includes a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "ethylene-based copolymer" refers to a copolymer that comprises a majority weight amount of polymerized ethylene based on the total weight of the copolymer and at least one comonomer.

The term "extra high voltage cable" refers to a cable to which a voltage of greater than or equal to 220 kV is intended to be applied without damage to the cable.

The term "high voltage cable" refers to a cable to which a voltage of 70 kV to less than 220 kV is intended to be applied without damage to the cable.

A "hydrocarbyl group" is a saturated or unsaturated linear, cyclic, or branched hydrocarbon group. Nonlimiting examples of suitable hydrocarbyl groups include, for example, alkyl groups (such as methyl, ethyl, n-propyl, i-propyl, n-butyl, t-butyl, i-butyl (or 2-methylpropyl), etc.) and alkenyl groups (such as ethenyl, propenyl, butenyl, etc.). In one embodiment, a hydrocarbyl group has 1 to 20 carbon atoms.

The term "medium voltage cable" refers to a cable to which a voltage of 2 kV to less than 70 kV is intended to be applied without damage to the cable.

The term "olefin-based polymer" refers to a polymer comprising a majority weight percent of polymerized olefin based on the total weight of the polymer, and optionally may contain at least one comonomer. Olefins include unsaturated, aliphatic or alicyclic, substituted or unsubstituted hydrocarbons having one or more double bonds. Nonlimiting examples of olefin-based polymers include homopolymers of olefins (e.g., polypropylene, polyethylene, etc.) and copolymers of olefins and at least one comonomer (e.g., propylene-based copolymers, ethylene-based copolymers, etc.).

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term copolymer as defined hereinafter. Trace amounts of impurities, for example, catalyst residues, may be incorporated into and/or within the polymer. The term "copolymer," as used herein, refers to polymers prepared by the polymerization of at least two different types of monomers. The generic term copolymer thus includes 4iopolymers (employed to refer to polymers prepared from two different types of monomers), and polymers prepared from more than two different types of monomers.

A "tree retardant" refers to an additive which inhibits or retards the formation of trees in a cable insulation material. Treeing, or the formation of trees in a cable insulation material, is a breakdown process due to partial discharges that progresses through the insulation material in a path resembling the branches of a tree. Treeing can be caused by water or electricity, and the term "tree retardant" encompasses both water tree retardants and electrical tree retardants. Electrical treeing occurs when the insulation material is subjected to high and divergent electrical field stress over a long period of time. Water treeing occurs when water enters the insulation material, generally at a defect, and causes partial discharges.

Test Methods

Crystallization Temperature:

The crystallization temperature is measured by DSC at 10°/minutes from 0° C. to 200° C. under nitrogen atmosphere. The exothermal peak temperature in the first cooling step is recorded as the crystallization temperature (Tc) with results reported in ° C.

Density:

Measured in accordance with ASTM D792 with results reported in grams per cubic centimeter (g/cc or g/cm$^3$).

Dissipation Factor:

The dissipation factor (DF) is the ratio of the real, in-phase power to the reactive, out of phase power. It is a measure of hysteresis in charging and discharging a dielectric. DF is a measure of the conversion of real power to reactive power, shown as heat by election or ion flow, and by dipole rotation. The dissipation factor is measured as set forth below and, unless otherwise mentioned, is reported in percent. The lower the reported DF in percent, the better the dielectric (i.e., insulation) properties of the polymer.

To measure DF, a OS87 (Yanggao Electronic Equipment Ltd., Shanghai, China) precision current comparator bridge is used to measure dissipation factor values. The desired frequency on the bridges is 50 Hz. The tan delta resolution is selected at 10$^{-6}$ (0.0001%). The electrodes with a thermocouple inside is immersed in silicon oil. The dissipation factor is measured from 95° C. to 105° C. and at 6, kV/mm, 10 kV/mm, 14 kV/mm, 10 kV/mm, and 6 kV/mm. The dissipation factor at 12 kV/mm at 105° C. is calculated from the curve of the dissipation factor versus stress level. As some conditioning effects may cause hysteresis between the initial step-wise increase and subsequent measurements, only the data during the second step-wise increase is used to characterize the dissipation factor of the specimens. Plaque thicknesses for all specimens is in the range of 0.65 mm to 0.75 mm.

Melt Index:

Measured in accordance with ASTM D1238, Condition 190° C. (2.16 kilograms (kg) weight, with results reported in grams per 10 minutes (g/10 min).

Melting Temperature:

Melting temperature is measured by DSC at 10° C./min from 0° C. to 200° C. under nitrogen atmosphere. The endothermal peak temperature in the first heating step is recorded as the melting temperature (Tm) with results reported in ° C.

Mole Percent Comonomer:

The mole percent comonomer is calculated using the equation mol %=wt %/Mn$_{(comonomer)}$/(wt %/Mn$_{(comonomer)}$+ (1−wt %)/Mn(C$_2$H$_4$)), wherein mol % is the mole percent commoner, wt % is the weight percent commoner, M$_{(comonomer)}$ is the number average molecular weight of the comonomer, and Mn(C$_2$H$_4$) is the number average molecular weight of ethene, with results reported in mole percent (mol %).

Moles Comonomer Per 100 Grams Copolymer:

The moles comonomer per 100 grams copolymer is calculated using the equation mol/100 g=wt %/ M$_{(comonomer)}$*100, wherein mol/100 g is the moles comonomer per 100 grams copolymer, wt % is the weight percent of the comonomer, and $Mn_{(comonomer)}$ is the number average molecular weight of the comonomer, with results reported in moles comonomer per 100 grams copolymer (mol/100 g).

Weight Percent (wt %) Comonomer:

Comonomer content for the experimental compositions (inventive and comparative) based on the amount of comonomer added to the reactor with the assumption that vinyl acetate will be nearly fully incorporated due to its high level of reactivity. The comonomer content is then confirmed through $^{13}C$ NMR spectroscopy and/or Fourier Transform Infrared Spectroscopy (FTIR).

$^{13}C$ NMR spectroscopy is one of a number of techniques for measuring comonomer incorporation into a polymer. An example of this technique is described for the determination of comonomer content for ethylene/α-olefin copolymers in James C. Randall, *A Review of High Resolution Liquid $^{13}$Carbon Nuclear Magnetic Resonance Characterizations of Ethylene-Based Polymers*, C29, J. Macromolecular Science, Polymer Revs. 201, 201-317 (1989). The basic procedure for determining the comonomer content of an olefin-based copolymer involves obtaining the $^{13}C$ NMR spectrum under conditions where the intensity of the peaks corresponding to the different carbons in the sample is directly proportional to the total number of contributing nuclei in the sample. Methods for ensuring this proportionality involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotropically labeled comonomer. The mole % comonomer can be determined by the ratio of the integrals corresponding to the number of moles of comonomer to the integrals corresponding to the number of moles of all of the monomers in the interpolymer, as described in Randall, for example.

Once NMR is utilized to determine the comonomer composition in one copolymer, FTIR can be used to determine it in the others, since the absorbance of the key functional groups will be approximately proportional to its concentration.

DETAILED DESCRIPTION

In an embodiment, the present disclosure provides a composition comprising a) an ethylene-based polymer comprising units derived from ethylene and units derived from at least one comonomer having the Structure I

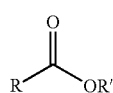

(Structure I)

wherein R is a $C_1$-$C_2$ hydrocarbyl group and R' is a $C_1$-$C_4$ hydrocarbyl group, b) at least one antioxidant, c) from greater than 0 wt % to less than 3 wt %, based on the total weight of the composition, of an organic peroxide, d) optionally, an ethylene homopolymer or ethylene/alpha-olefin copolymer, e) optionally, a curing coagent, and f) optionally, at least one tree retardant, wherein the ethylene-based copolymer has a melt temperature in ° C. (Tm) and a comonomer content in moles per 100 grams of ethylene-based comonomer (mol/100 g) (comonomer) that satisfies the relationship Tm<−73.022(comonomer)+109.3.

Ethylene-Based Copolymer

In an embodiment, the composition comprises at least one ethylene-based copolymer comprising units derived from ethylene and units derived from at least one comonomer having the Structure I

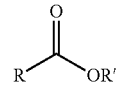

(Structure I)

wherein R is a $C_1$-$C_2$ hydrocarbyl group and R' is a $C_1$-$C_4$ hydrocarbyl group, and wherein the ethylene-based copolymer has a melt temperature in ° C. (Tm) and a comonomer content in moles per 100 grams of ethylene-based comonomer (mol/100 g) (comonomer) that satisfies the relationship Tm<−73.022(comonomer)+109.3.

Nonlimiting examples of suitable R groups include unsubstituted $C_1$-$C_2$ alkyl groups and unsubstituted $C_2$ alkenyl groups, including methyl groups, ethyl groups, and ethenyl groups. In an embodiment, the R group is selected from a methyl group and an unsubstituted ethene group.

Nonlimiting examples of suitable R' groups include unsubstituted $C_1$-$C_4$ alkyl groups and unsubstituted $C_2$-$C_4$ alkenyl groups, including methyl groups, ethyl groups, propyl groups, butyl groups, ethenyl groups, propenyl groups, and butenyl groups. The unsubstituted $C_1$-$C_4$ alkyl groups and unsubstituted $C_2$-$C_4$ alkenyl groups may be branched or linear. In an embodiment, the R' group is an unsubstituted linear $C_1$-$C_4$ alkyl group or an unsubstituted $C_2$ alkenyl group, including, for example, a methyl group, an ethyl group, a propyl group, a butyl group or an ethenyl group. In a further embodiment, the R' group is selected from a methyl group, an ethyl group, a butyl group and an ethenyl group. In an embodiment, the R' group is selected from a methyl group, an ethyl group, and a linear butyl group.

In an embodiment, the R group is selected from an unsubstituted methyl group and an unsubstituted ethenyl group and the R' group is selected from an unsubstituted linear $C_1$-$C_4$ alkyl group and an unsubstituted $C_2$ ethenyl group. One nonlimiting example of a suitable comonomer of Structure I includes vinyl acetate having the Structure II

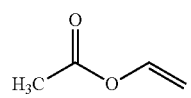

(Structure II)

Another nonlimiting example of a suitable comonomer of Structure I includes $C_1$-$C_4$ alkyl acrylates having the Structure III

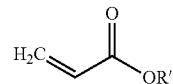

(Structure III)

wherein R' is a $C_1$-$C_4$ alkyl group as specified above. In a particular embodiment, the R' group is selected from an unsubstituted methane group, an unsubstituted ethane, and an unsubstituted linear butane group.

In an embodiment, the comonomer of Structure III is butyl acrylate.

In an embodiment, the ethylene-based copolymer is a bipolymer of ethylene and the comonomer of Structure I, or more particularly a biopolymer of ethylene and the comonomer of Structure II or Structure III. Nonlimiting examples of suitable ethylene-based biopolymers include ethylene/vinyl acetate bipolymer, ethylene/methyl acrylate bipolymer, ethylene/ethyl acrylate bipolymer, and ethylene/butyl acrylate bipolymer. In an embodiment, the ethylene-based bipolymer is an ethylene/butyl acrylate bipolymer.

The ethylene-based copolymer comprising units derived from ethylene and units derived from at least one comonomer of Structure I may include two or more different comonomer types. For example, the ethylene-based copolymer may include units derived from ethylene and units derived from two or more comonomers of Structure I. In another embodiment, the ethylene-based copolymer may include units derived from ethylene, units derived from one or more comonomers of Structure I, and one or more comonomers having a structure other than Structure I. Nonlimiting examples of comonomers other than Structure I include alpha-olefins.

The comonomer of Structure I is present in the ethylene-based copolymer in an amount from greater than 0 wt %, or 1 wt %, or 3 wt %, or 5 wt %, or 10 wt %, or 15 wt %, or 20 wt %, or 25 wt % to 30 wt %, or 35 wt %, or 40 wt %, or 45 wt %, or less than 50 wt %, based on the total weight of the ethylene-based copolymer. In an embodiment, the comonomer of Structure I is present in the ethylene-based copolymer in an amount from 1 wt %, or 3 wt %, or 5 wt %, or 10 wt %, or 15 wt % to 20 wt %, or 25 wt %, or 30 wt %, based on the total weight of the ethylene-based copolymer.

The comonomer of Structure I is present in the ethylene-based copolymer in an amount from greater than 0 mol %, or 0.5 mol %, or 1 mol %, or 3 mol %, or 5 mol %, or 10 mol %, or 15 mol %, or 20 mol %, or 25 mol % to 30 mol %, or 35 mol %, or 40 mol %, or 45 mol %, or less than 50 mol %, based on the total weight of the ethylene-based copolymer. In an embodiment, the comonomer of Structure I is present in the ethylene-based copolymer in an amount from greater than 0 mol %, or 0.5 mol %, or 1.0 mol %, or 1.5 mol %, or 2.0 mol %, or 2.5 mol %, or 3.0 mol % to 4.0 mol %, or 5.0 mol %, or 6.0 mol %, or 7.0 mol %, or 8.0 mol %, or 9.0 mol %, or 10.0 mol %, based on the total moles of the ethylene-based copolymer.

The comonomer of Structure I is present in the ethylene-based copolymer in an amount from greater than 0.000 mol/100 g, or 0.020 mol/100 g, or 0.040 mol/100 g, or 0.060 mol/100 g, or 0.080 mol/100 g, or 0.100 mol/100 g, or 0.110 mol/100 g, or 0.120 mol/100 g, or 0.130 mol/100 g to 0.140 mol/100 g, or 0.150 mol/100 g, or 0.160 mol/100 g, or 0.170 mol/100 g, or 0.180 mol/100 g, or 0.190 mol/100 g, or 0.200 mol/100 g, or 0.220 mol/100, or 0.240 mol/100 g, or 0.260 mol/100 g, or 0.280 mol/100 g, or 0.300 mol/100 g. In an embodiment, the comonomer of Structure I is present in the ethylene-based copolymer in an amount from 0.020 mol/100 g, or 0.040 mol/100 g, or 0.060 mol/100 g, or 0.080 mol/100, or 0.100 mol/100 g, or 0.125 mol/100 g to 0.130 mol/100 g, or 0.140 mol/100 g, or 0.150 mol/100 g, or 0.175 mol/100 g, or 0.200 mol/100 g, or 0.225 mol/100 g, or 0.250 mol/100 g.

The ethylene-based copolymer has a melt temperature Tm from greater than 60° C., or 70° C., or 80° C., or 90° C., or 95° C. to 100° C., or 105° C., or 110° C., or 120° C., or 130° C. In an embodiment, the ethylene-based copolymer has a Tm from 70° C., or 75° C., or 80° C., or 85° C., or 90° C., or 95° C. to 100° C., or 105° C., or 110° C.

The ethylene-based copolymer has a melt temperature Tm and a comonomer content in mol/100 g (comonomer) that satisfies the relationship Tm<−73.022(comonomer)+109.3. In an embodiment, the ethylene-based copolymer has a melt temperature Tm and a comonomer content in mol/100 g (comonomer) that satisfies the relationship Tm<−73.022(comonomer)+109.3, or Tm<−74(comonomer)+109.3, or Tm<−75(comonomer)+109.3.

The ethylene-based copolymer has a melt index (MI) from greater than or equal to 0.1 g/10 minutes (g/10 min), or 0.5 g/10 min, or 1.0 g/10 min, or 2.5 g/10 min, or 5 g/10 min, or 10 g/10 min to 20 g/10 min, or 30 g/10 min, or 40 g/10 min, or 50 g/10 min, or 100 g/10 min, or 150 g/10 min. In an embodiment, the ethylene-based copolymer has a MI from greater than or equal to 0.1 g/10 min, or 0.2 g/10 min, or 0.3 g/10 min to 0.4 g/10 min, or 0.5 g/10 min, or 0.6 g/10 min, or 0.7 g/10 min, or 0.8 g/10 min, or 0.9 g/10 min, or 1.0 g/10 min.

The ethylene-based copolymer has a crystallization temperature (Tc) from 50° C., or 55° C., or 60° C., or 65° C., or 70° C. to 75° C., or 80° C., or 85° C., or 90° C., or 95° C. or 100° C., or 105° C., or 110° C. In an embodiment, the ethylene-based copolymer has a Tc from 50° C., or 55° C., or 60° C., or 65° C. to 70° C., or 75° C., or 80° C. or 85° C., or 90° C., or 95° C.

In an embodiment, the ethylene-based copolymer has a density from 0.910 g/cc, or 0.925 g/cc to 0.935 g/cc, or 0.940 g/cc.

The ethylene-based copolymer is made using an autoclave process.

In an embodiment, the ethylene-based copolymer comprising units derived from ethylene and units derived from at least one comonomer of Structure I comprises one, some or all of the following properties:

(i) a comonomer content from greater than; and/or from greater than 0 mol %, or 0.5 mol %, or 1.0 mol %, or 1.5 mol %, or 2.0 mol %, or 2.5 mol %, or 3.0 mol % to 4.0 mol %, or 5.0 mol %, or 6.0 mol %, or 7.0 mol %, or 8.0 mol %, or 9.0 mol %, or 10.0 mol %, based on the total moles of the ethylene-based copolymer; and/or (ii) a comonomer content from 1 wt %, or 3 wt %, or 5 wt %, or 10 wt %, or 15 wt % to 20 wt %, or 25 wt %, or 30 wt %, based on the total weight of the ethylene-based copolymer; and/or (iii) a comonomer content from 0.020 mol/100 g, or 0.040 mol/100 g, or 0.060 mol/100 g, or 0.080 mol/100, or 0.100 mol/100 g, or 0.125 mol/100 g to 0.130 mol/100 g. or 0.140 mol/100 g. or 0.150 mol/100 g, or 0.175 mol/100 g. or 0.200 mol/100 g, or 0.225 mol/100 g, or 0.250 mol/100 g; and/or (iv) a melt temperature Tm from greater than 70° C., or 75° C. or 80° C., or 85° C., or 90° C., or 95° C. to 100° C., or 105° C., or 110° C.; and/or (v) a melt temperature Tm and a comonomer content in mol/100 g (comonomer) that satisfies the relationship Tm<−74(comonomer)+109.3; and/or (vi) a melt index of from greater than or equal to greater than or equal to 0.1 g/10 min, or 0.2 g/10 min, or 0.3 g/10 min to 0.4 g/10 min, 0.5 g/10 min, or 0.6 g/10 min, or 0.7 g/10 min, or 0.8 g/10 min, or 0.9 g/10 min, or 1.0 g/10 min; and/or (vii) a crystallization temperature (Tc) from 50° C., or 55° C., or 60° C., or 65° C. to 70° C., or 75° C., or 80° C., or 85° C., or 90° C., or 95° C.

In an embodiment, the ethylene-based copolymer comprises at least two, at least three, at least four, at least five, at least six, or all seven of properties (i)-(vii). The ethylene-based copolymer comprising one, at least two, at least three, at least four, at least five, at least six, or all seven of properties (i)-(vii) may be a bipolymer of ethylene and the comonomer of Structure I. In an embodiment, the ethylene-based copolymer comprising one, at least two, at least three, at least four, at least five, at least six, or all seven of properties (i)-(vii) is a bipolymer of ethylene and the comonomer of Structure II or Structure III.

In a particular embodiment, the ethylene-based copolymer is a bipolymer of ethylene and the at least one comonomer of Structure III and has one, at least two, at least three, at least four, at least five, at least six, or all seven of properties (i)-(vii). The bipolymer of ethylene and the comonomer of Structure III can be selected from a bipolymer of ethylene and a comonomer selected from methyl acrylate, ethyl acrylate and butyl acrylate. In an embodiment, the ethylene-based copolymer is a bipolymer of ethylene and butyl acrylate and has one, at least two, at least three, at least four, at least five, at least six, or all seven of properties (i)-(vii).

A blend of two or more ethylene-based copolymers, wherein each of the ethylene-based copolymers comprises units derived from ethylene and units derived from at least one comonomer of Structure I, may be used in the composition.

In an embodiment, the composition is free of any olefin-based polymers other than the ethylene-based copolymer comprising units derived from ethylene and units derived from at least one comonomer of Structure I or blend of two or more such ethylene-based copolymers. As used herein, the phrase "free of olefin-based polymers other than the ethylene-based copolymer comprising units derived from ethylene and units derived from at least one comonomer of Structure I or blend of two or more such ethylene-based copolymers" means the composition comprises from 0 wt % to less than or equal to 1 wt %, or to less than or equal to 0.5 wt %, or to less than or equal to 0.1 wt %, or to less than or equal to 0.05 wt %, or to less than or equal to 0.01 wt % of olefin-based polymers other than the ethylene-based copolymer comprising units derived from ethylene and units derived from at least one comonomer of Structure I or blend of two or more such ethylene-based copolymers, based on the total weight of the composition.

In an embodiment, the ethylene-based copolymer comprising units derived from ethylene and units derived from at least one comonomer of Structure I or blend of two or more such ethylene-based copolymers is present in the composition to the exclusion of all other olefin-based polymers.

The ethylene-based copolymer comprising units derived from ethylene and units derived from at least one comonomer of Structure I or blend of two or more such ethylene-based copolymers is present in an amount from 50 wt %, or 60 wt %, or 70 wt %, or 75 wt %, or 80 wt %, or 85 wt % to 90 wt %, or 95 wt %, or 96 wt %, or 97 wt %, or 98 wt %, or 99 wt %, based on the total weight of the composition.

Antioxidants

The composition comprises at least one antioxidant. Antioxidants are types or classes of chemical compounds that are capable of being used to minimize the oxidation that can occur during the processing of polymers. The term "antioxidant" also includes chemical derivatives of the antioxidants, including hydrocarbyl.

Antioxidants that can be used in the practice of this disclosure include, but are not limited to, hindered or semi-hindered phenols, aromatic amines, aliphatic hindered amines, organic phosphites and phosphonites, thio compounds, and combinations of any two or more thereof.

Preferred antioxidants include hindered phenols such as tetrakis[methylene(3,5-di-tert-butyl-4-hydroxyhydrocinnamate)]methane, bis[(beta-(3,5-ditert-butyl-4-hydroxybenzyl)-methylcarboxyethyl)]-sulphide, and thiodiethylene bis (3,5-di-tert-butyl-4-hydroxy hydrocinnamate); phosphites and phosphonites such as tris(2,4-di-tert-butylphenyl)phosphite and di-tert-butylphenyl-phosphonite; thioethers such as 4,4'-thiobis(2-t-butyl-5-methylphenol) and 2,2'-Thiobis (4-methyl-6-tert-butylphenol); semi hindered phenols such as 1,3,5-Tris(4-tert-butyl-3-hydroxy-2,6-dimethylbenzyl)-1, 3,5,-triazine-2,4,6-trione; thioesters such as dilaurylthiodipropionate, dimyristylthiodipropionate, distearylthiodipropionate (DSTDP), and pentaerythritol tetrakis (B-laurylthiopropionate); various siloxanes; and various amines such as polymerized 2,2,4-trimethyl-1,2,2-dihydroquinoline, 4,4'-bis(alpha,alpha-dimethylbenzyl) diphenylamine, N,N'-bis(2,2,6,6-tetramethyl-4-piperidyl)-N,N'-diformylhexamethylenediamine, alkylated diphenylamines, and hindered amine light stabilizers. Additional examples can be found in *Plastic Additives Handbook*, Gachter et al, 1985. Preferably, the antioxidant is one or more of a thioether, a thioester, 4,4'-thiobis(2-t-butyl-5-methylphenol), DSTDP, tetrakis[methylene(3,5-di-tert-butyl-4-hydroxyhydrocinnamate)]methane, or 1,3,5-Tris(4-tert-butyl-3-hydroxy-2,6-dimethylbenzyl)-1,3,5-triazine-2,4,6-trione. More preferably, the antioxidant is one or more of 4,4'-thiobis(2-t-butyl-5-methylphenol), DSTDP, tetrakis[methylene(3,5-di-tert-butyl-4-hydroxyhydrocinnamate)]methane, 1,3,5-Tris(4-tert-butyl-3-hydroxy-2,6-dimethylbenzyl)-1,3,5-triazine-2,4,6-trione, or N,N'-bis(2,2,6,6-tetrametyl-4-piperidyl)-N,N'-diformylhexamethylenediamine.

The composition can contain more than one antioxidant.

The antioxidant is present in the composition in an amount from 0.001 wt %, or 0.01 wt %, or 0.1 wt %, or 0.2 wt %, or 0.3 wt % to 0.4 wt %, or 0.5 wt %, or 1.0 wt %, or 2.0 wt %, or 3.0 wt %, or 4.0 wt %, 5.0 wt % based on the total weight of the composition.

Organic Peroxide

The composition comprises an organic peroxide. In an embodiment, the organic peroxide has a decomposition temperature of 100 to 220° C. for a half-life of 10 minutes. Exemplary organic peroxides (with their decomposition temperatures in ° C. following in parenthesis) include, but are not limited to, succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy) hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl-peroxy)hexane (155), t-butyl dicumyl peroxide (155), di-t-butyl peroxide (160), alpha,alpha'-bis-t-butylperoxy-1,4-diisopropylbenzene (160), and 2,5-dimethyl-2,5-di(t-butyl-peroxy) hexyne (170). In a particular embodiment, the organic peroxide is one or more of dicumyl peroxide, 2,5-dimethyl-2,5-di(t-butyl-peroxy)hexane, t-butyl dicumyl peroxide, dit-butyl peroxide, 2,5-dimethyl-2,5-di(t-butyl-peroxy)-3-hexyne, and alpha,alpha'-bis-t-butylperoxy-1,4-diisopropylebenzene.

The peroxide can be added to the composition as a liquid after the composition has been melt blended and formed into pellets. In such an embodiment, the peroxide is typically sprayed onto the pellets although alternative forms of application can be employed, e.g., immersion, splashing, etc. The melt-blended composition, typically in the form of a pellet, is thus impregnated, e.g., soaked, with the peroxide, optionally in combination with one or more additives, e.g., cure co-agents, antioxidants, scorch inhibitors, nitrogenous bases, etc., typically until the pellet is dry to the touch. Once the peroxide and any additives are absorbed into the pellet, the pellet is ready for packaging.

In other embodiments, the peroxide is compounded into the polymer prior to melt filtration.

The amount of peroxide in the composition is from greater than 0 wt %, or 0.1 wt %, or 0.15 wt %, or 0.2 wt %, or 0.25 wt %, or 0.5 wt %, or 0.75 wt % to 1.0 wt %, or 1.25 wt %, or 1.5 wt %, or 1.75 wt %, or 2.0 wt %, or 2.25 wt %, or 2.5 wt %, or 2.75 wt %, or 3.0 wt %, based on the total weight of the composition.

Co-Agent

The composition optionally includes, a co-agent or cross-linking (cure) booster. The co-agent can be any one, or a mixture, of co-agents, including, but not limited to, an ester, ether, ketone, cyanurate, isocyanurate, phosphate, ortho formate, aliphatic or aromatic ether containing at least 2, and preferably 3, unsaturated groups such as allyl, vinyl or acrylate. The number of carbon atoms in the co-agent can be in the range of 9 to 40 or more, and is preferably 9 to 20.

Specific examples of co-agents include, but are not limited to, triallyl cyanurate (TAC); triallyl-1,3,5-triazine-2,4,6(1H,3H,5H)-trione also known as triallyl isocyanturate (TAIC); hexaallyl melamine; trallyl phosphate; triallyl ortho formate; tetra-allyloxy-ethane; triallyl benzene-1,3,5-tricarboxylate; diallyl phthalate; zinc dimethacrylate; ethoxylated bisphenol A dimethacrylate; methacrylate terminated monomer with average chain length of C14 or C15; pentaerythritol tetraacrylate; depentaerythritol pentaacrylate; pentaerythritol triacrylate; dimethylolpropane tetraacrylate; ethoxylated trimethylolpropane triacrylate; trimethylolpropane triacrylate; 2,4,6-triallyl-1,3,5-trione; 2,4-diphenyl-4-methyl-1-pentene; triallyl trimellitate (TATM); 3,9-divinyl-2,4,8,10-tetra-oxaspiro[5.5]undecane (DVS); and alpha-methyl styrene dimer (AMSD), as well as the other co-agents described in U.S. Pat. Nos. 5,346,961 and 4,018,852.

In an embodiment, the one or more co-agents is one or more of AMSD and TAIC.

If present, coagents are used in amounts of greater than 0 wt % (e.g., 0.01 wt %), or 0.1 wt %, or 0.2 wt % to 0.4 wt %, or 0.5 wt %, or 1.0 wt %, or 3 wt %, based on the weight of the composition.

Tree Retardant

The composition optionally includes one or more tree retardants. Tree retardants include water tree retardants, electrical tree retardants, and combinations thereof. Nonlimiting examples of suitable water tree retardants includes alcohols of 6 to 24 carbon atoms (U.S. Pat. No. 4,206,260), organo-silanes, e.g., a silane containing an epoxy-containing radical, (U.S. Pat. No. 4,144,202), inorganic ionic salts of strong acids and strong Zwitter-ion compounds (U.S. Pat. No. 3,499,791), ferrocene compounds and substitute quinolone compounds (U.S. Pat. No. 3,956,420), polyhydric alcohols, and silicone fluids (U.S. Pat. No. 3,795,646). Polyglycols are a preferred class of water tree retardants. Polyethylene glycol (PEG) is a particularly preferred water tree retardant, particularly for use with ethylene-based copolymers, and particularly hydroxyl and/or vinyl end-capped PEG. Nonlimiting examples of suitable electrical tree retardants include hindered amine light stabilizers as well as certain voltage stabilizers such as oligomers and polymers of high molecular weight and delocalized electron structures, such as, for example, carotenoids, carotenoid analogs, carotenoid derivatives, conducting polymers, carbon black and combinations thereof (U.S. Pat. No. 8,680,399).

Some tree retardants may function to inhibit the formation of both water treeing and electrical treeing, such as described in, for example, U.S. Pat. Nos. 4,299,713 and 4,400,429.

Ethylene Homopolymer or Ethylene/Alpha-Olefin Copolymer

In an embodiment, the composition optionally includes an ethylene homopolymer and/or ethylene/alpha-olefin copolymer. Nonlimiting examples of suitable ethylene/alpha-olefin copolymers include copolymers of ethylene and one or more alpha-olefins having 3 to 12 carbon atoms. Suitable ethylene homopolymers and ethylene/alpha-olefin compolymers can be heterogeneous or homogeneous.

Typical catalyst systems which are used to prepare suitable ethylene homopolymers and ethylene/alpha-olefin copolymers are magnesium/titanium based catalyst, systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,973,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems which use chromium or molybdenum oxides on silica-alumina supports can be included here. Processes for preparing suitable ethylene homopolymers and ethylene/alpha-olefin copolymers are also described in the above-mentioned documents. In situ blends of polyethylene homopolymers and/or ethylene/alpha-olefin copolymers and processes and catalyst systems for providing the same are described in U.S. Pat. Nos. 5,371,145 and 5,405,901.

Nonlimiting examples of suitable ethylene homopolymers and ethylene/alpha-olefin copolymers include low density homopolymers of ethylene made by high pressure processes (HP-LDPE), linear low density polyethylenes (LLDPE), very low density polyethylenes (VLDPE), medium density polyethylenes (MDPE), high density polyethylene (HDPE) having a density greater than 0.940 g/cc, and metallocene copolymers with densities less than 0.900 g/cc.

VLDPE can be a copolymer of ethylene and one or more alpha-olefins having from 3 to 12 carbon atoms. The density of the VLDPE can be from 0.870 g/cc to 0.915 g/cc. The LLDPE can include VLDPE and MDPE, which are also linear, but, generally, have a density from 0.916 g/cc to 0.925 g/cc. LLDPE can be a copolymer of ethylene and one or more alpha-olefins having from 3 to 12 carbon atoms.

Additives

Additional additives can be added to the composition before, during and/or after processing. The amount of additive is usually in the range of about 0.01 wt % to about 3 wt/based on the total weight of the composition. Useful additives include additional antioxidants, ultraviolet absorbers, antistatic agents, slip agents, plasticizers, processing aids, lubricants, stabilizers, flow aids, water tree inhibitors such as polyethylene glycol, cure boosters, scorch inhibitors, and viscosity control agents.

Composition

The present disclosure provides a composition comprising a) an ethylene-based copolymer comprising units derived from ethylene and units derived from at least one comonomer of Structure I, b) at least one antioxidant, c) from greater than 0 wt % to less than 3 wt % of an organic peroxide, based on the total weight of the composition, d) optionally, at least one co-agent, and e) optionally, at least one tree retardant, wherein the ethylene-based copolymer has a melt temperature Tm and a comonomer content in mol/100 g (comonomer) that satisfies the relationship Tm<−73.022(comonomer)+109.3.

In an embodiment, the composition comprises a) an ethylene-based copolymer comprising units derived from ethylene and units derived from at least one comonomer of Structure I, b) at least one antioxidant, c) from greater than 0 wt % to less than 3 wt % of an organic peroxide, based on the total weight of the composition, d) optionally, at least one co-agent, and e) optionally, at least one tree retardant, wherein the ethylene-based copolymer has a melt temperature Tm and a comonomer content in mol/100 g (comonomer) that satisfies the relationship Tm<−73.022(comonomer)+109.3.

(1) the ethylene-based copolymer is a bipolymer of ethylene and the comonomer of Structure I; and/or (2) the comonomer of Structure I is selected from vinyl acetate, methyl acrylate, ethyl acrylate and butyl acrylate; and/or (3) the at least one co-agent (d) is present; and/or (4) the at least one tree retardant is present; and/or (5) the at least one antioxidant is at least one of a thioether, a thioester, DSTDP, 4,4'-thiobis(2-t-butyl-5-methylphenol), tetrakis[methylene(3,5-di-tert-butyl-4-hydroxyhydrocinnamate)]methane, 1,3,5-Tris(4-tert-butyl-3-hydroxy-2,6-dimethylbenzyl)-1,3,5-triazine-2,4,6-trione and N,N'-bis(2,2,6,6-tetramethyl-4-piperidyl)-N,N'-diformylhexamethylenediamine, or a combination of two or more thereof.

In an embodiment, the composition includes (1) and at least one of (2) to (5), above. Specifically, an exemplary composition includes (1) and (2), or (1) and (3), or (1) and (4), or (1) and (5), above.

In an embodiment, the composition includes (2) and at least one of (3) to (5), above. Specifically, an exemplary composition includes (2) and (3), or (2) and (4), or (2) and (5).

In an embodiment, the composition includes (3) and at least one of (4) and (5), above. Specifically, an exemplary composition includes (3) and (4), or (3) and (5).

In an embodiment, the composition includes (4) and (5).

In an embodiment, the composition includes at least three of (1)-(5). Specifically, an exemplary composition includes (1), (2) and (3); or (1), (2) and (4); or (1), (2) and (5); or (1), (3), and (4); or (1), (3) and (5); or (1). (4) and (5); or (2), (3), and (4); or (2), (3) and (5); or (2), (4) and (5); or (3), (4) and (5).

In an embodiment, the composition includes at least four of (1)-(5). Specifically, an exemplary composition includes (1), (2), (3) and (4); or (1), (2), (3) and (5); or (1), (3), (4) and (5); or (2), (3), (4) and (5).

In an embodiment, the composition includes all five of (1)-(5).

In one embodiment, the ethylene-based polymer is crosslinked.

The crosslinked composition has a dissipation factor from 0%, or greater than 0%, or 0.00010%, or 0.00050%, or 0.00075%, or 0.00100% to 0.00250%, or 0.00500%, or 0.00750%, or 0.01000% at a temperature of 105° C. and an electrical stress of 12 kV/mm. In another embodiment, the crosslinked composition has a dissipation factor from 0%, or greater than 0%, or 0.00010%, or 0.00050%, or 0.00075%, or 0.00100%, or 0.00200% to 0.00300%, or 0.00500%, or 0.00750%, or 0.01000% at a temperature of 105° C. and an electrical stress of 12 kV/mm. In another embodiment, the crosslinked composition has a dissipation factor from 0%, or greater than 0%, or 0.00010%, or 0.00020%, or 0.00030%, or 0.00040%, or 0.00050% to 0.00060%, or 0.00070%, or 0.00080%, or 0.00090%, or 0.00100% at a temperature of 105° C. and an electrical stress of 12 kV/mm.

Composition 1:

In an embodiment, the composition comprises a) from 90 wt %, or 92 wt %, or 94 wt % to 96 wt %, or 98 wt %, or 99 wt %, based on the total weight of the composition, of an ethylene-based copolymer comprising units derived from ethylene and from 0.020 mol/100 g, or 0.040 mol/100 g, or 0.060 mol/100 g, or 0.080 mol/100 g, or 0.100 mol/100 g, or 0.125 mol/100 g to 0.130 mol/100 g, or 0.140 mol/100 g, or 0.150 mol/100 g, or 0.175 mol/100 g, or 0.200 mol/100 g, or 0.225 mol/100 g, or 0.250 mol/100 g. units derived from a comonomer of Structure I and having a melting temperature Tm from 70° C., or 75° C., or 80° C., or 85° C., or 90° C., or 95° C. to 100° C., or 105° C., or 110° C., b) from 0.10 wt %, or 0.15 wt %, or 0.20 wt % to 0.25 wt %, or 0.30 wt %, or 0.35 wt %, 0.40 wt %, or 0.45 wt % based on the total weight of the composition, of at least one antioxidant, c) from 0.3 wt %, or 0.4 wt %, or 0.5 wt %, or 0.6 wt % to 0.7 wt %, or 0.8 wt %, or 0.9 wt %, or 1.0 wt % of an organic peroxide, based on the total weight of the composition, d) from 0.5 wt %, 0.6 wt %, or 0.7 wt %, or 0.8 wt % to 0.9 wt %, or 1.0 wt %, or 1.1 wt %, or 1.2 wt %, based on the total weight of the composition, of at least one co-agent, and e) optionally, at least one tree retardant, wherein the ethylene-based copolymer has a melt temperature Tm and a comonomer content in mol/100 g (comonomer) that satisfies the relationship Tm<−73.022(comonomer)+109.3.

Composition 2:

In an embodiment, the composition comprises a) from 90 wt %, or 92 wt %, or 94 wt % to 96 wt %, or 98 wt %, or 99 wt %, based on the total weight of the composition, of an ethylene-based bipolymer comprising units derived from ethylene and from 0.020 mol/100 g, or 0.040 mol/100 g, or 0.060 mol/100 g, or 0.080 mol/100 g, or 0.100 mol/100 g, or 0.125 mol/100 g to 0.130 mol/100 g, or 0.140 mol/100 g, or 0.150 mol/100 g, or 0.175 mol/100 g, or 0.200 mol/100 g, or 0.225 mol/100 g, or 0.250 mol/100 g. units derived from a comonomer of Structure II or Structure III and having a melting temperature Tm from 70° C., or 75° C., or 80° C., or 85° C., or 90° C., or 95° C. to 100° C., or 105° C., or 110° C., b) from 0.10 wt %, or 0.15 wt %, or 0.20 wt % to 0.25 wt %, or 0.30 wt %, or 0.35 wt %, 0.40 wt %, or 0.45 wt % based on the total weight of the composition, of at least one antioxidant, c) from 0.3 wt %, or 0.4 wt %, or 0.5 wt %, or 0.6 wt % to 0.7 wt %, or 0.8 wt %, or 0.9 wt %, or 1.0 wt % of an organic peroxide, based on the total weight of the composition, d) from 0.5 wt %, 0.6 wt %, or 0.7 wt %, or 0.8 wt % to 0.9 wt %, or 1.0 wt %, or 1.1 wt %, or 1.2 wt %, based on the total weight of the composition, of at least one co-agent, and e) optionally, at least one tree retardant, wherein the ethylene-based copolymer has a melt temperature Tm and a comonomer content in mol/100 g (comonomer) that satisfies the relationship Tm<−73.022(comonomer)+109.3.

Composition 3:

In an embodiment, the composition comprises a) from 90 wt %, or 92 wt %, or 94 wt % to 96 wt %, or 98 wt %, or 99 wt %, based on the total weight of the composition, of an ethylene-based bipolymer comprising units derived from ethylene and from 0.020 mol/100 g, or 0.040 mol/100 g, or 0.060 mol/100 g, or 0.080 mol/100 g, or 0.100 mol/100 g, or 0.125 mol/100 g to 0.130 mol/100 g, or 0.140 mol/100 g, or 0.150 mol/100 g, or 0.175 mol/100 g, or 0.200 mol/100 g, or 0.225 mol/100 g, or 0.250 mol/100 g. units derived from a comonomer of Structure II or Structure III and having a melting temperature Tm from 70° C., or 75° C., or 80° C., or 85° C., or 90° C., or 95° C. to 100° C., or 105° C., or 110° C., b) from 0.10 wt %, or 0.12 wt %, or 0.13 wt %, or 0.14 wt %, or 0.15 wt % to 0.16 wt %, or 0.17 wt %, or 0.18 wt %, or 0.19 wt %, or 0.2 wt %, based on the total weight of the composition, of at least one antioxidant, c) from 0.3 wt %, or 0.4 wt %, or 0.5 wt %/o, or 0.6 wt % to 0.7 wt %, or 0.8 wt %, or 0.9 wt %, or 1.0 wt % of an organic peroxide, based on the total weight of the composition, d) from 0.5 wt %, 0.6 wt %, or 0.7 wt %, or 0.8 wt % to 0.9 wt %, or 1.0 wt %, or 1.1 wt %, or 1.2 wt %, based on the total weight of the composition, of at least one co-agent, and e) optionally, at least one tree retardant, wherein the ethylene-based copolymer has a melt temperature Tm and a comonomer content in mol/100 g (comonomer) that satisfies the relationship Tm<−73.022(comonomer)+109.3.

Composition 4:

In an embodiment, the composition comprises a) from 90 wt %/o, or 92 wt %, or 94 wt % to 96 wt %, or 98 wt %, or 99 wt %, based on the total weight of the composition, of an ethylene-based bipolymer comprising units derived from ethylene and from 0.020 mol/100 g, or 0.040 mol/100 g, or 0.060 mol/100 g, or 0.080 mol/100 g, or 0.100 mol/100 g, or 0.125 mol/100 g to 0.130 mol/100 g, or 0.140 mol/100 g, or 0.150 mol/100 g, or 0.175 mol/100 g, or 0.200 mol/100 g, or 0.225 mol/100 g, or 0.250 mol/100 g. units derived from a comonomer of Structure II or Structure III and having a melting temperature Tm from 70° C., or 75° C., or 80° C., or 85° C., or 90° C., or 95° C. to 100° C., or 105° C., or 110° C., b) from greater than 0.20 wt %, or 0.22 wt %, 0.24 wt %, 0.26 wt %, or 0.28 wt %, or 0.30 wt % to 0.32 wt %, or 0.34 wt %, or 0.36 wt %, or 0.38 wt %, or 0.40 wt %, or 0.42 wt %, or 0.45 wt %, based on the total weight of the composition, of at least one antioxidant, c) from 0.3 wt %, or 0.4 wt %, or 0.5 wt %, or 0.6 wt % to 0.7 wt %, or 0.8 wt %, or 0.9 wt %, or 1.0 wt % of an organic peroxide, based on the total weight of the composition, d) from 0.5 wt %, 0.6 wt %, or 0.7 wt %, or 0.8 wt % to 0.9 wt %, or 1.0 wt %, or 1.1 wt %, or 1.2 wt %, based on the total weight of the composition, of at least one co-agent, e) optionally, at least one tree retardant, wherein the ethylene-based copolymer has a melt temperature Tm and a comonomer content in mol/100 g (comonomer) that satisfies the relationship Tm<−73.022(comonomer)+109.3.

Composition 5:

In an embodiment, the composition comprises a) from 90 wt %, or 92 wt %, or 94 wt % to 96 wt %, or 98 wt %, or 99 wt %, based on the total weight of the composition, of an ethylene-based bipolymer comprising units derived from ethylene and from 0.020 mol/100 g, or 0.040 mol/100 g, or 0.060 mol/100 g, or 0.080 mol/100 g, or 0.100 mol/100 g, or 0.125 mol/100 g to 0.130 mol/100 g, or 0.140 mol/100 g, or 0.150 mol/100 g, or 0.175 mol/100 g, or 0.200 mol/100 g, or 0.225 mol/100 g, or 0.250 mol/100 g. units derived from a comonomer of Structure II or Structure III and having a melting temperature Tm from 70° C., or 75° C., or 80° C., or 85° C., or 90° C., or 95° C. to 100° C., or 105° C., or 110° C., b) from greater than 0.20 wt %, or 0.22 wt %, 0.24 wt %, 0.26 wt %, or 0.28 wt %, or 0.30 wt % to 0.32 wt %, or 0.34 wt %, or 0.36 wt %, or 0.38 wt %, or 0.40 wt %, or 0.42 wt %, or 0.45 wt %, based on the total weight of the composition, of at least one antioxidant, c) from 0.3 wt %, or 0.4 wt %, or 0.5 wt %, or 0.6 wt % to 0.7 wt %, or 0.8 wt %, or 0.9 wt %, or 1.0 wt % of an organic peroxide, based on the total weight of the composition, d) from 0.5 wt %, 0.6 wt %, or 0.7 wt %, or 0.8 wt % to 0.9 wt %, or 1.0 wt %, or 1.1 wt %, or 1.2 wt %, based on the total weight of the composition, of at least one co-agent, e) optionally, at least one tree retardant, and f) from 1 wt %, or 2 wt %, 3 wt %, or 4 wt % to 5 wt %, or 6 wt %, or 7 wt %, or 8 wt % of LDPE, wherein the ethylene-based copolymer has a melt temperature Tm and a comonomer content in mol/100 g (comonomer) that satisfies the relationship Tm<−73.022 (comonomer)+109.3.

In an embodiment, the composition is according to Composition 1, Composition 2, Composition 3, Composition 4, or Composition 5, wherein the ethylene-based copolymer or ethylene-based bipolymer is crosslinked and the composition has a dissipation factor from 0%, or greater than 0%, or 0.00010%, or 0.00050%, or 0.00075%, or 0.00100% to 0.00250%, or 0.00500%, or 0.00750%, or 0.01000% at a temperature of 105° C. and an electrical stress of 12 kV/mm.

In an embodiment, the composition is according to Composition 1, Composition 2, Composition 3, Composition 4, or Composition 5, wherein the ethylene-based copolymer or ethylene-based bipolymer is crosslinked and the composition has a dissipation factor from 0%, or 0.00010%, or 0.00050%, or 0.00075%, or 0.00100%, or 0.00200% to 0.00300%, or 0.00500%, or 0.00750%, or 0.01000% at a temperature of 105° C. and an electrical stress of 12 kV/mm.

In an embodiment, the composition is according to Composition 5, wherein the ethylene-based bipolymer is crosslinked and the composition has a dissipation factor from 0%, or greater than 0%, or 0.00010%, or 0.00020%, or 0.00030%, or 0.00040%, or 0.00050% to 0.00060%, or 0.00070%, or 0.00080%, or 0.00090%, or 0.00100% at a temperature of 105° C. and an electrical stress of 12 kV/mm.

It was surprisingly discovered that the disclosed composition comprising an ethylene-based copolymer comprising units derived from ethylene and units derived from at least one comonomer of Structure I, wherein the ethylene-based copolymer has a melt temperature Tm and a comonomer content in mol/100 g (comonomer) that satisfies the relationship Tm<−73.022(comonomer)+109.3, exhibits improved (lower) dissipation factor. Particularly, it was discovered that ethylene-based copolymers comprising units derived from ethylene and units derived from at least one comonomer of Structure I made by an autoclave process have a Tm and comonomer content that meets the relationship, while ethylene-based copolymers of identical or comparable comonomer content made using a tubular polymerization process do not. It was surprisingly discovered that compositions comprising such ethylene-based polymers made using an autoclave polymerization process, and therefore satisfy the Tm and comonomer content relationship Tm<−73.022(comonomer)+109.3 have a lower (improved) dissipation factor compared to compositions having an identical constitution but with the ethylene-based copolymer made using a tubular process instead. Not to be bound by any particular theory, it is contemplated that the distribution of the comonomer in the copolymer affects the dissipation factor. Copolymers formed using a tubular polymerization process usually have uneven distribution of comonomer, which leads to a higher local polar group density. In contrast, copolymers made using an autoclave process usually have a more even distribution of comonomer along the copolymer. The high polar group density of the copolymers made using the tubular process increases the dissipation factor compared to identical copolymers (i.e., same comonomer type and comonomer content) made using an autoclave process.

When referring to dissipation factor herein, the term is generally used as it relates to the performance of insulation compositions in AC applications. However, it is anticipated that the disclosed compositions also exhibit additive solubility enhancement and improved electrical performance in DC applications.

Cable

The present disclosure also provides for a cable, such as a power cable, comprising a layer (e.g., insulation layer) comprising a composition as described herein. In one embodiment, the present disclosure provides for a cable, such as a power cable, comprising a conductor, and an insulation layer covering at least a portion of the conductor, the insulation layer comprising a composition as described herein. In an embodiment, the insulation layer comprises a composition comprising a) an ethylene-based copolymer comprising units derived from ethylene and units derived from at least one comonomer of Structure I, b) at least one antioxidant, c) from greater than 0 wt % to less than 3 wt % of an organic peroxide, based on the total weight of the composition, d) optionally, at least one co-agent, and e) optionally, at least one tree retardant, wherein the ethylene-based copolymer has a melt temperature Tm and a comonomer content in mol/100 g (comonomer) that satisfies the relationship Tm<−73.022(comonomer)+109.3.

In an embodiment, the ethylene-based copolymer is crosslinked.

In an embodiment, the cable has an insulation layer made of any of Composition 1, Composition 2, Composition 3, Composition 4 or Composition 5.

In an embodiment, the compositions of this disclosure can be applied to a cable or wire as an insulation in known amounts and by known methods (for example, with the equipment and methods described in U.S. Pat. Nos. 5,246,783 and 4,144,202). Typically, the sheath composition is prepared in a reactor-extruder equipped with a cable-coating die and after the components of the composition are formulated, the composition is extruded over one or more conductors as the cable is drawn through the die.

In an embodiment, the insulation layer is characterized by a dissipation factor dissipation factor from 0%, or greater than 0%, or 0.00010%, or 0.00050%, or 0.00075%, or 0.00100% to 0.00250%, or 0.00500%, or 0.00750%, or 0.01000% at a temperature of 105° C. and an electrical stress of 12 kV/mm. In another embodiment, the insulation layer is characterized by a dissipation factor from 0%, or greater than 0%, or 0.00010%, or 0.00050%, or 0.00075%, or 0.00100%, or 0.00200% to 0.00300%, or 0.00500%, or 0.00750%, or 0.01000% at a temperature of 105'C and an electrical stress of 12 kV/mm. In another embodiment, the insulation layer is characterized by a dissipation factor from 0%, or greater than 0%, or 0.00010%, or 0.00020%, or 0.00030%, or 0.00040%, or 0.00050% to 0.00060%, or 0.00070%, or 0.00080%, or 0.00090%, or 0.00100% at a temperature of 105'C and an electrical stress of 12 kV/mm.

In an embodiment, the insulation layer is made of a composition according to Composition 1, Composition 2, Composition 3, Composition 4, or Composition 5, wherein the ethylene-based copolymer or ethylene-based bipolymer is crosslinked and the insulation layer has a dissipation factor from 0%, or greater than 0%, or 0.00010%, or 0.00050%, or 0.00075%, or 0.00100% to 0.00250%, or 0.00500%, or 0.00750%, or 0.01000% at a temperature of 105° C. and an electrical stress of 12 kV/mm.

In an embodiment, the insulation layer is made of a composition according to Composition 1, Composition 2, Composition 3, Composition 4, or Composition 5, wherein the ethylene-based copolymer or ethylene-based bipolymer is crosslinked and the composition has a dissipation factor from 0%, or 0.00010%, or 0.00050%, or 0.00075%, or 0.00100%, or 0.00200% to 0.00300%, or 0.00500%, or 0.00750%, or 0.01000% at a temperature of 105° C. and an electrical stress of 12 kV/mm.

In an embodiment, the insulation layer is made of a composition according to Composition 5, wherein the ethylene-based bipolymer is crosslinked and the composition has a dissipation factor from 0%, or greater than 0%, or 0.00010%, or 0.00020%, or 0.00030%, or 0.00040%, or 0.00050% to 0.00060%, or 0.00070%, or 0.00080%, or 0.00090%, or 0.00100% at a temperature of 105° C. and an electrical stress of 12 kV/mm.

In one embodiment, the cable is selected from the group consisting of a medium voltage (MV) cable, a high voltage cable (HV) and an extra-high voltage (EHV) cable. In an embodiment, the cable is preferably selected from the group consisting of a HV cable and an EHV cable. For example, and specifically to MV, HV and EHV cables, it is desirable to have a dissipation factor of from 0 to less than 0.3 up to 120° C. up to threshold electrical stress levels. Particularly, for MV cables, it is desirable to have a dissipation factor of from 0 to less than 0.3 at 105° C. and an electrical stress of at least 6 kV/mm. For HV cables, it is desirable to have a dissipation factor of from 0 to less than 0.3 at 105° C. and an electrical stress of at least 12 kV/mm. For EHV cables, it is desirable to have a dissipation factor of from 0 to less than 0.1 at 105° C. and an electrical stress of at least 16 kV/mm. In testing cables at voltages significantly greater than the standard operating conductions for the cable and rated voltage, it is desirable to have a dissipation factor remain from 0 to less than 0.1 even at higher stress levels, for example, up to 6 kV/mm, 12 kV/mm, 16 kV/mm, and even up to 23 kV/mm.

More particularly, and specifically to MV, HV and EHV cables, it is desirable for the insulation layer of such cables to be characterized as having a dissipation factor of from 0 to less than 0.3 up to 105° C. up to threshold electrical stress levels. Particularly, for MV cables, it is desirable for the insulation layer of such cables to be characterized as having a dissipation factor of from 0 to less than 0.3 at 105° C. and an electrical stress of at least 6 kV/mm. For HV cables, it is desirable for the insulation layer of such cables to be characterized as having a dissipation factor of from 0 to less than 0.3 at 105° C. and an electrical stress of at least 12 kV/mm. For EHV cables, it is desirable for the insulation layer of such cables to be characterized as having a dissipation factor of from 0 to less than 0.1 at 105° C. and an electrical stress of at least 16 kV/mm. In testing cables at voltages significantly greater than the standard operating conductions for the cable and rated voltage, it is desirable for the insulation layer of such cables to be characterized as having a dissipation factor which remains from 0 to less than 0.1 even at higher stress levels, for example, up to 6 kV/mm, 12 kV/mm, 16 kV/mm, and even up to 23 kV/mm.

In another embodiment, the disclosure provides a method of conducting electricity, the method comprising applying a voltage of from greater than or equal to 2 kV, or from greater than or equal to 70 kV to greater than 220 kV, or to less than or equal to 220 kV across a cable including an insulation layer comprising a composition as provided herein. In an embodiment, the cable include a conductor and an insulation layer covering at least a portion of the conductor, the insulation layer comprising a composition comprising a) an ethylene-based copolymer comprising units derived from ethylene and units derived from at least one comonomer of Structure I, b) at least one antioxidant, c) from greater than 0 wt % to less than 3 wt % of an organic peroxide, based on the total weight of the composition, d) optionally, at least one co-agent, and e) optionally, at least one tree retardant, wherein the ethylene-based copolymer has a melt temperature Tm and a comonomer content in mol/100 g (comonomer) that satisfies the relationship Tm<−73.022(comonomer)+109.3.

In further embodiments, the voltage applied across the cable is selected from the group consisting of medium voltage (i.e., from greater than or equal to 2 kV to less than 70 kV), high voltage (i.e., from greater than or equal to 70 kV to less than 220 kV), and extra-high voltage (i.e., greater than or equal to 220 kV).

By way of example, and not limitation, some embodiments of the present disclosure will now be described in detail in the following Examples.

EXAMPLES

The polymers, compositions and processes of this disclosure, and their use, are more fully described by the following examples. The following examples are provided for the purpose of illustrating the disclosure, and are not to be construed as limiting the scope of the present disclosure.
Materials The ethylene-based copolymers used in the comparative samples and inventive examples are described in Table 1.

Antioxidant: Blend of DSTDP, 1,3,5-Tris(4-tert-butyl-3-hydroxy-2,6-dimethylbenzyl)-1,3,5-triazine-2,4,6-trione, and N,N'-bis(2,2,6,6-tetramethyl-4-piperidyl)-N,N'-diformyl-hexamethylenediamine Organic Peroxide: dicumyl peroxide Coagent: triallyl isocyanurate (TAIC), available as Trilink 7 from Lianda Corp.

PE: low density ethylene homopolymer (LDPE) with a density of 0.92 g/cc and a MI of 2.3 g/10 min, available as DXM-446 from the Dow Chemical Company.

The correlation between comonomer content and melt temperature (Tm) for EBA and EMA made by the two different processes is shown in FIG. 1 using a sample of the copolymers set forth in Table 1. Particularly, FIG. 1 is generated using AEBA5-AEBA9, AEMA1-AEMA3, and AEMA5-AEMA6 for autoclave polymerized ethylene-based copolymers and the control, TEBA1, and TEMA1-TEMA3 for tubular polymerized ethylene-based copolymers. As shown in FIG. 1, at a given comonomer content and comonomer type, ethylene-based copolymers made using an autoclave polymerization process generally have lower melting temperatures than ethylene-based copolymers made using a tubular polymerization process. The effect of this difference on the dissipation factor is illustrated in the samples below.

Sample Preparation

Crosslinkable compositions are prepared with the amounts of the materials as set forth in Tables 2-4, below. For each sample, the ethylene-based copolymer, and, in some instance, LDPE, is fluxed in a Brabender mixer bowl targeting at 120° C. at 35 revolutions per minute (rpm) for 4 minutes. The resulting material is cut into small pieces and fed into a single screw extruder at 120° C. for pelletization.

TABLE 1

Ethylene-Based Copolymers

| Material | Comonomer (wt %) | Comonomer (mol/100 g) | Comonomer (mol %) | MI (g/10 min) | Melting Point (° C.) | Crystallization Temperature (° C.) | Manufacturing Process | Comonomer |
|---|---|---|---|---|---|---|---|---|
| AEBA1 | 3 | 0.024 | 0.7 | 0.3 | 107.1 | 95.9 | Autoclave | BA |
| AEBA2 | 8 | 0.063 | 1.9 | 0.3 | 104.6 | 89.2 | Autoclave | BA |
| AEBA3 | 13 | 0.103 | 3.2 | 0.3 | 100.2 | 83.2 | Autoclave | BA |
| AEBA4 | 17 | 0.135 | 4.3 | 0.4 | 95.5 | 80.4 | Autoclave | BA |
| AEBA5 | 17 | 0.135 | | | 93.0 | | Autoclave | BA |
| AEBA6 | 28 | 0.222 | | | 75.0 | | Autoclave | BA |
| AEBA7 | 30 | 0.238 | 8.4 | 0.2 | 72.8 | 55.8 | Autoclave | BA |
| AEBA8 | 35 | 0.278 | | | 66.0 | | Autoclave | BA |
| AEBA9 | 15 | 0.278 | | | 65.0 | | Autoclave | BA |
| AEMA1 | 18.5 | 0.22 | | | 83.0 | | Autoclave | MA |
| AEMA2 | 20 | 0.23 | | | 76.0 | | Autoclave | MA |
| AEMA3 | 24 | 0.279 | 9.4 | 0.5 | 73.7 | 54.0 | Autoclave | MA |
| AEMA4 | 24 | 0.279 | 9.4 | 2 | 68.0 | | Autoclave | MA |
| AEMA5 | 24.5 | 0.28 | | | 68.0 | | Autoclave | MA |
| AEBM6 | 29 | 0.34 | | | 61.0 | | Autoclave | MA |
| Control | 0 | 0 | 0 | 2 | 109.3 | 95.4 | Tubular | — |
| TEBA1 | 35 | 0.278 | | | 89.0 | | Tubular | BA |
| TEEA1 | 19 | 0.190 | 6.5 | 19 | 97.7 | 76.4 | Tubular | EA |
| TEMA1 | 20 | 0.238 | | | 97.0 | | Tubular | MA |
| TEMA2 | 24 | 0.279 | | | 95.0 | | Tubular | MA |
| TEMA3 | 29 | 0.337 | 11.9 | 3 | 96.7 | 78.4 | Tubular | MA |

EB = ethylene-based copolymer;
BA = butyl acrylate;
MA = methyl acrylate;
EA = ethyl acrylate;
AEBA = autoclave ethylene/butyl acrylate;
AEMA = autoclave ethylene/methyl acrylate;
TEBA = tubular ethylene/butyl acrytate;
TEEA = tubular ethylenelethyl acrylate;
TEMA = tubular ethylene/methyl acrylate The pelleted intermediate compounds are soaked with the peroxide, coagent and/or antioxidant at the amounts set forth in Tables 2-4 at 70° C. for 8 hours.

The cured samples are prepared by preheating the soaked pellets at 130° C. for 5 minutes. Any air trapped in the sample is released by opening and closing the platens 8 times. The sample is allowed to heat for another 5 minutes to increase the platen temperature to 182° C. Curing is completed under a pressure of 100 kilonewtons (kN) for 15 minutes. The sample is allowed to cool over another 5 minutes to reach a plate temperature of 45° C.

The resulting crosslinked plaques are degassed at 80° C. for 2 days before assessing for the dissipation factor from 95° C. to 105° C. using 6 kilovolt per millimeter (kV/mm), 10 kV/mm and 14 kV/mm test conditions as described above. The dissipation factor at 12 kV/mm and 105° C. is calculated from the curve of dissipation factor v. stress level and reported in Tables 2-4 below.

TABLE 2

Sample Formulations of Polymer, Peroxide, Coagent and Antioxidant

| Ex. | Polymer | Comonomer Content (mol/100 g) | Amount Copolymer (wt %) | Amount Peroxide (wt %) | Amount Coagent (wt %) | Antioxidant Amount (wt %) | Dissipation Factor (12 kV/mm, 105° C.) (%) |
|---|---|---|---|---|---|---|---|
| IE1 | AEBA1 | 0.024 | 98.13 | 0.7 | 1.0 | 0.17 | 6.50E−04 |
| IE2 | AEBA2 | 0.063 | 98.13 | 0.7 | 1.0 | 0.17 | 5.50E−04 |
| IE3 | AEBA3 | 0.103 | 98.13 | 0.7 | 1.0 | 0.17 | 7.50E−04 |
| IE4 | AEBA4 | 0.135 | 98.13 | 0.7 | 1.0 | 0.17 | 1.25E−03 |
| IE5 | AEBA7 | 0.238 | 98.13 | 0.7 | 1.0 | 0.17 | 7.30E−03 |
| IE6 | AEMA3 | 0.279 | 98.13 | 0.7 | 1.0 | 0.17 | 6.70E−03 |
| CS1 | TEMA3 | 0.337 | 98.13 | 0.7 | 1.0 | 0.17 | 1.53E−02 |
| CS2 | TEEA1 | 0.190 | 98.13 | 0.7 | 1.0 | 0.17 | 1.41E−02 |

IE = inventive example
CS = comparative sample

Figure 2:
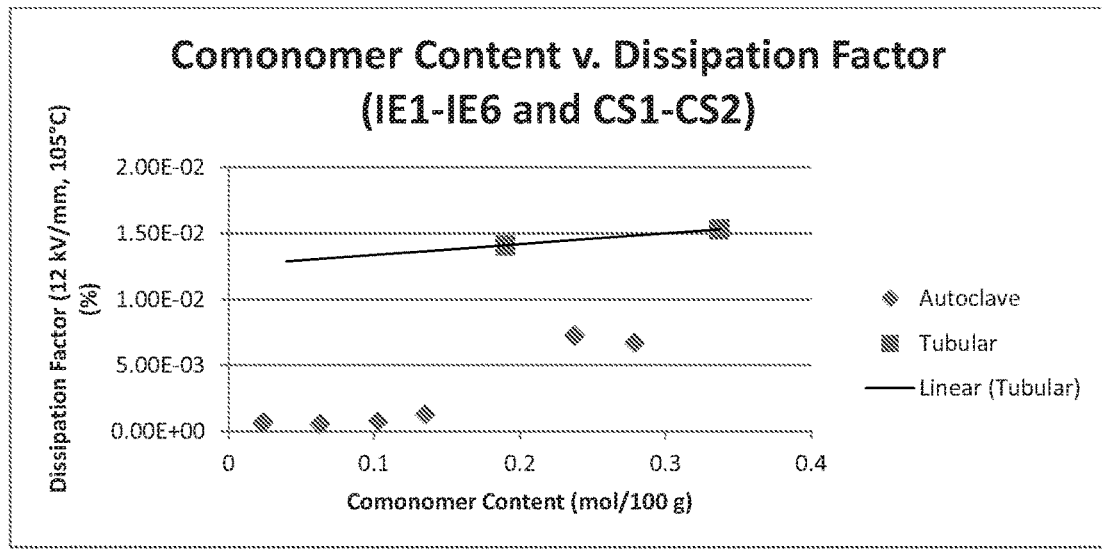
FIG. 2 is a graph showing the dissipation factor as a function of comonomer content for the comparative samples and inventive examples of Table 2.

FIG. 2 shows the dissipation factor as a function of comonomer content for the samples of Table 2.

TABLE 3

Sample Formulations of Polymer, Peroxide, Coagent and Antioxidant

| Ex. | Polymer | Comonomer Content (mol/100 g) | Amount Copolymer (wt %) | Amount Peroxide (wt %) | Amount Coagent (wt %) | Antioxidant Amount (wt %) | Dissipation Factor (12 kV/mm, 105° C.) (%) |
|---|---|---|---|---|---|---|---|
| IE7 | AEBA1 | 0.024 | 97.93 | 0.7 | 1.0 | 0.37 | 6.70E−04 |
| IE8 | AEBA2 | 0.063 | 97.93 | 0.7 | 1.0 | 0.37 | 9.00E−04 |
| IE9 | AEBA3 | 0.103 | 97.93 | 0.7 | 1.0 | 0.37 | 1.00E−03 |
| IE10 | AEBA4 | 0.135 | 97.93 | 0.7 | 1.0 | 0.37 | 1.50E−03 |
| IE11 | AEBA7 | 0.238 | 97.93 | 0.7 | 1.0 | 0.37 | 4.10E−03 |
| IE12 | AEMA3 | 0.279 | 97.93 | 0.7 | 1.0 | 0.37 | 5.00E−03 |
| CS3 | TEMA3 | 0.337 | 97.93 | 0.7 | 1.0 | 0.37 | 2.10E−02 |

IE = inventive example
CS = comparative sample

Figure 3:
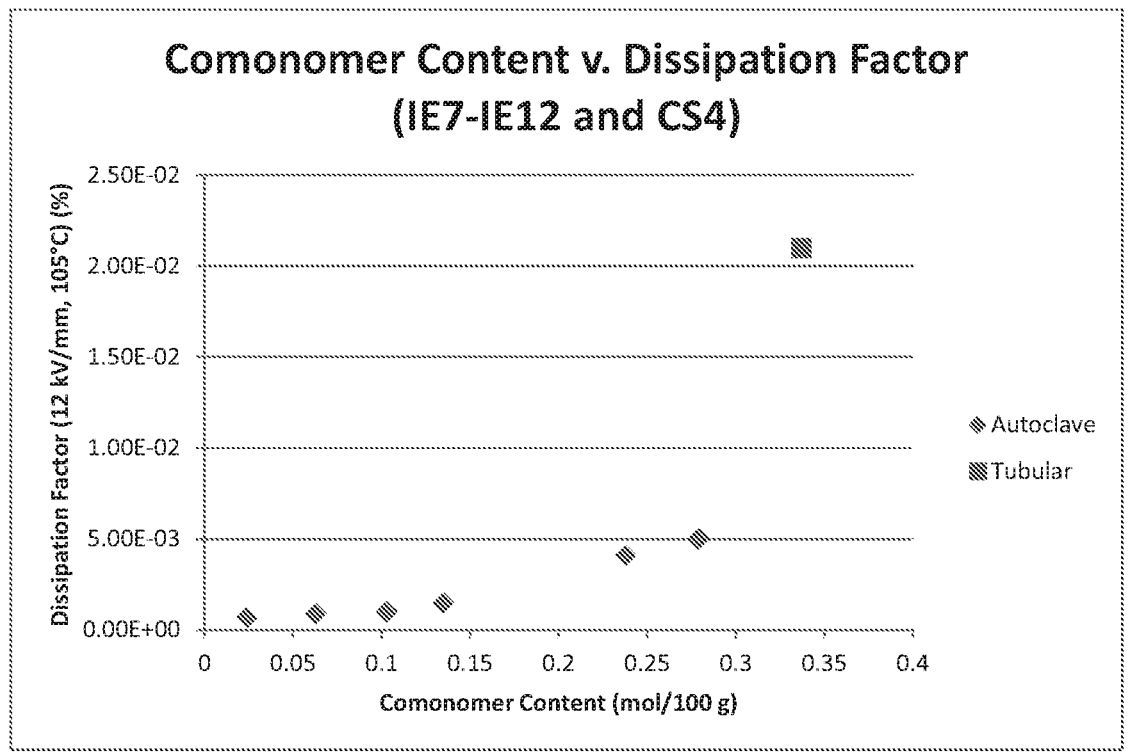
FIG. 3 is a graph showing the dissipation factor as a function of comonomer content for the comparative samples and inventive examples of Table 3.

FIG. 3 shows the dissipation factor as a function of comonomer content for the samples of Table 3.

TABLE 4

Sample Formulations of Polymer/PE Blend with Peroxide, Coagent and Antioxidant

| Ex. | Amount Polymer | Copolymer (wt %) | Amount PE (wt %) | Comonomer Content in Polymer Blend (mol/100 g) | Amount Peroxide (wt %) | Amount Coagent (wt %) | Amount Antioxidant (wt %) | Dissipation Factor (12 kV/mm. 150° C.) (%) |
|---|---|---|---|---|---|---|---|---|
| CS4 | TEEA1 | 91.96 | 6 | 0.012 | 0.7 | 1.0 | 0.34 | 2.6E−03 |
| CS5 | TEEA1 | 85.96 | 12 | 0.024 | 0.7 | 1.0 | 0.34 | 1.60E−03 |
| CS6 | TEMA3 | 95.96 | 2 | 0.007 | 0.7 | 1.0 | 0.34 | 1.20E−03 |
| CS7 | TEMA3 | 92.96 | 5 | 0.017 | 0.7 | 1.0 | 0.34 | 1.70E−03 |
| IE13 | AEMA3 | 94.96 | 3 | 0.008 | 0.7 | 1.0 | 0.34 | 4.30E−04 |
| IE14 | AEMA4 | 95.96 | 2 | 0.006 | 0.7 | 1.0 | 0.34 | 4.80E−04 |
| IE15 | AEMA4 | 92.96 | 5 | 0.014 | 0.7 | 1.0 | 0.34 | 6.50E−04 |
| IE16 | AEBA7 | 94.36 | 3.60 | 0.008 | 0.7 | 1.0 | 0.34 | 4.50E−04 |

IE = inventive example
CS = comparative sample

Figure 4:
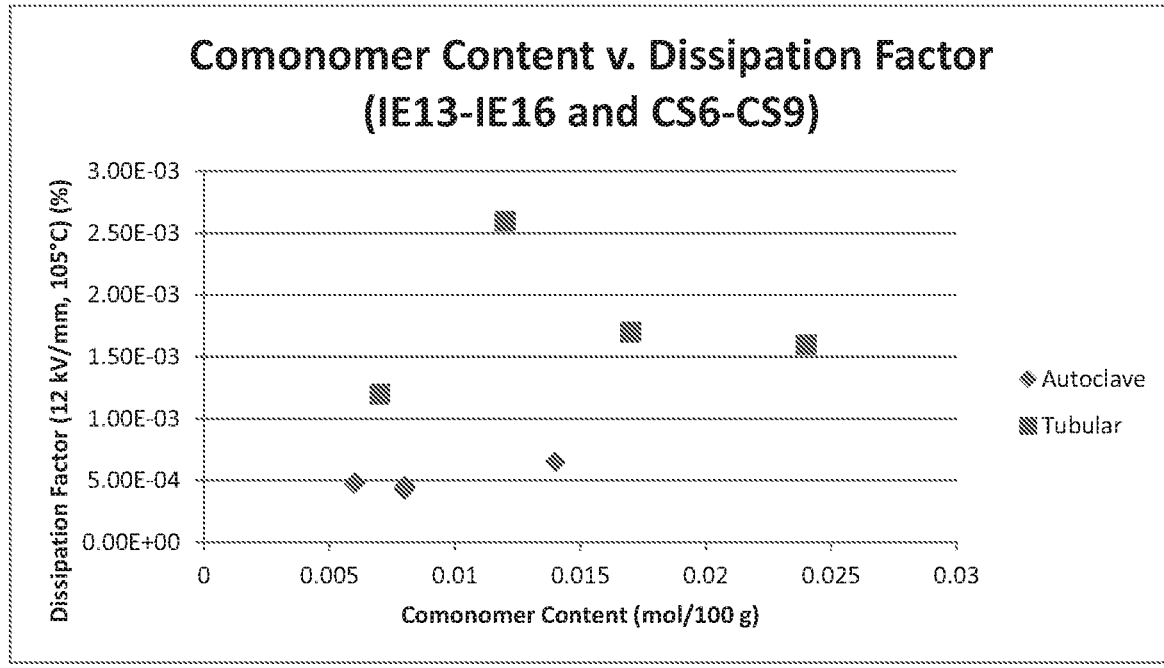
FIG. 4 is a graph showing the dissipation factor as a function of comonomer content for the comparative samples and inventive examples of Table 4.

FIG. 4 shows the dissipation factor as a function of comonomer content for the samples of Table 4.

As shown in Table 1 and FIG. 1, the melting point of an ethylene-based copolymer comprising units derived from ethylene and units derived from at least one comonomer of Structure I, at a given comonomer content, is dependent on the comonomer type. Autoclave polymerization unexpectedly enables production of an ethylene-based copolymer comprising units derived from ethylene and units derived from at least one comonomer of Structure I that satisfy the relationship Tm<−73.022(comonomer)+109.3, wherein Tm is the melting point in ° C. and comonomer is the comonomer content of the copolymer in moles per 100 grams of ethylene-based polymer (mol/100 g), whereas tubular polymerization fails to produce such ethylene-based polymers which meet the relationship.

As shown in Tables 2-4 and FIGS. 2-4, the dissipation factor of compositions composed of at least (a) an ethylene-based copolymer comprising units derived from ethylene and units derived from at least one comonomer of Structure I which satisfy the relationship Tm<−73.022(comonomer)+109.3, wherein Tm is the melting point in ° C. and comonomer is the comonomer content of the copolymer in mol/100 g, (b) at least one antioxidant, and (c) from greater than 0 wt % to less than 3 wt %, based on the total weight of the composition, of an organic peroxide have a lower dissipation factor than compositions composed of at least (a) an ethylene-based copolymer comprising units derived from ethylene and units derived from at least one $C_2$-$C_3$ alkyl ester which does not meet the relationship Tm<−73.022(comonomer)+109.3, (b) at least one antioxidant, and (c) from greater than 0 wt % to less than 3 wt %, based on the total weight of the composition, of an organic peroxide. Particularly, composition including the ethylene/butyl acrylate bipolymers made using an autoclave process, and therefore meeting the relationship Tm<−73.022(comonomer)+109.3 exhibit significantly lower dissipation factor than compositions made with the ethylene/butyl acrylate bipolymers made using a tubular process, and therefore not meeting the relationship Tm<−73.022(comonomer)+109.3, at a given comonomer content.

For example, in Table 2/FIG. 2 and Table 3/FIG. 3. Inventive Examples 1-12, each using an ethylene/butyl acrylate bipolymer or ethylene/methyl acrylate bipolymer made using an autoclave process, has a dissipation factor less than Comparative Samples 1, 2 and 3, each of which use an ethylene/methyl acrylate bipolymer or ethylene/ethyl acrylate bipolymer made using a tubular process, at a given comonomer content.

Table 4 and FIG. 4 show that the dissipation factor of a composition comprising a blend of the ethylene-based copolymer with units derived from ethylene and units derived from at least one comonomer of Structure I that meet the relationship Tm<−73.022(comonomer)+109.3 and another olefin-based polymer, e.g., LDPE, have a lower dissipation factor than compositions comprising an ethylene-based copolymer made using a tubular process, and which therefore does not meet the relationship Tm<−73.022(comonomer)+109.3, in place of the ethylene-based copolymer made using an autoclave process in the blend.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:
1. A composition comprising:
a) an ethylene-based copolymer comprising:
   (i) units derived from ethylene and units derived from at least one comonomer of Structure I,

(Structure I)

$$\underset{R}{\overset{O}{\parallel}}\underset{}{\text{—C—OR'}}$$

wherein R is a $C_1$-$C_2$ hydrocarbyl group and R' is a $C_1$-$C_4$ hydrocarbyl group; and
   (ii) a comonomer content from greater than 0 to 0.30 mol/100 g;
b) at least one antioxidant,
c) from greater than 0 wt% to less than 3 wt% of an organic peroxide, based on the total weight of the composition, d) optionally, at least one co-agent, and e) optionally, at least one tree retardant, wherein the ethylene-based copolymer has a melt temperature (Tm) (° C.) and a comonomer content in moles per 100 grams ethylene-based copolymer (mol/100 g) (comonomer) that satisfies the relationship Tm<−73.022(comonomer)+109.3; and the composition having a dissipation factor from 0% to 0.001%, at a temperature of 105° C. and an electrical stress of 12 kV/mm.

2. The composition of claim 1 wherein the ethylene-based copolymer is a bipolymer.

3. The composition of claim 1, wherein the ethylene-based copolymer comprises from 0.020 mol/100 g to 0.250 mol/100 g comonomer.

4. The composition of claim 1, wherein the ethylene-based copolymer has a melt temperature from 70° C. to 110° C.

5. The composition of claim 1, wherein the ethylene-based copolymer is crosslinked.

6. The composition of claim 5, wherein the composition comprises
a) from 90 wt % to 99 wt % based on the total weight of the composition, of the ethylene-based copolymer, wherein the ethylene-based copolymer is a biopolymer of ethylene and a comonomer of Structure III

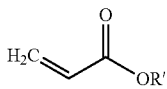

(Structure III)

wherein R' is a $C_1$-$C_4$ hydrocarbyl group,
b) from 0.10 wt % to 0.20 wt %, based on the total weight of the composition, of the antioxidant;
c) from 0.3 wt % to 1.0 wt % based on the total weight of the composition, of the organic peroxide; and
d) from 0.5 wt % to 1.2 wt % based on the total weight of the composition, of the co-agent, and
wherein the composition has a dissipation factor from 0% to 0.001%, at a temperature of 105° C. and an electrical stress of 12 kV/mm.

7. The composition of claim 6, wherein the composition comprises less than 1 wt %, based on the total weight of the composition, of olefin-based polymers other than the ethylene-based copolymer.

8. The composition of claim 5, wherein the composition comprises
a) from 90 w t% to 99 wt % based on the total weight of the composition, of the ethylene-based copolymer, wherein the ethylene-based copolymer is a biopolymer of ethylene and a comonomer of Structure III;

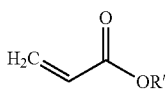

(Structure III)

wherein R' is a $C_1$-$C_4$ hydrocarbyl group,
b) from greater than 0.20 wt % to 0.45 wt %, based on the total weight of the composition, of the antioxidant;
c) from 0.3 wt % to 1.0 wt % based on the total weight of the composition, of the organic peroxide; and
d) from 0.5 wt % to 1.2 wt % based on the total weight of the composition, of the co-agent, and
wherein the dissipation from 0% to 0.001%, at a temperature of 105° C. and an electrical stress of 12 kV/mm.

9. The composition of claim 8, wherein the composition comprises less than 1 wt %, based on the total weight of the composition, of olefin-based polymers other than the ethylene-based copolymer.

10. The composition of claim 5, wherein the composition comprises
a) 90 wt % to 99 wt % based on the total weight of the composition, of the ethylene-based copolymer, wherein the ethylene-based copolymer is a biopolymer of ethylene and a comonomer of Structure III;

wherein R' is a $C_1$-$C_4$ hydrocarbyl group,
b) from a greater than 0.20 wt % to 0.45 wt %, based on the total weight of the composition, of the antioxidant;
c) from 0.3 wt % to 1.0 wt % based on the total weight of the composition, of the organic peroxide; a
d) from 0.5 wt % to 1.2 wt % based on the total weight of the composition, of the co-agent; and
f) from 1 wt % to 8 wt %, based on the weight of the composition of LDPE; wherein the composition has a dissipation factor from 0% to 0.001%, at a temperature of 105° C. and an electrical stress of 12 kV/mm.

11. A cable comprising an insulation layer comprising the composition of claim 10.

12. The cable of claim 11, wherein the cable is selected from the group consisting of a medium voltage cable, a high voltage cable, and an extra-high voltage cable.

13. The composition of claim 1, wherein the ethylene-based copolymer has a melt index ($I_2$) from 0.1 to 150 grams per 10 minutes (g/10 min).

14. The composition of claim 1, wherein the comonomer is butyl acrylate.

15. The composition of claim 1, wherein the comonomer is methyl acrylate.

16. A cable comprising:
a conductor; and
an insulation layer covering at least a portion of the conductor, the insulation layer comprising:
a) an ethylene-based copolymer comprising:
(i) units derived from ethylene and units derived from at least one comonomer of Structure I,

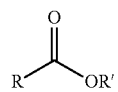

(Structure I)

wherein R is a $C_1$-$C_2$ hydrocarbyl group and R' is a $C_1$-$C_4$ hydrocarbyl group; and
(ii) a comonomer content from greater than 0 to 0.30 mol/100 g;
b) at least one antioxidant,
c) from greater than 0 wt % to less than 3 wt % of an organic peroxide, based on the total weight of the composition,
d) optionally, at least one co-agent, and
e) optionally, at least one tree retardant,
wherein the ethylene-based copolymer has a melt temperature (Tm) (° C.) and a comonomer content in moles per 100 grams ethylene-based copolymer (mol/100 g) (comonomer) that satisfies the relationship Tm<−73.022(comonomer)+109.3; and the composition having a dissipation factor from 0% to 0.001%, at a temperature of 105° C. and an electrical stress of 12 kV/mm.

17. A method of conducting electricity, the method comprising applying voltage of from 2 kV to greater than 220 kV across the cable of claim 16.

* * * * *